United States Patent Office 3,443,462
Patented May 13, 1969

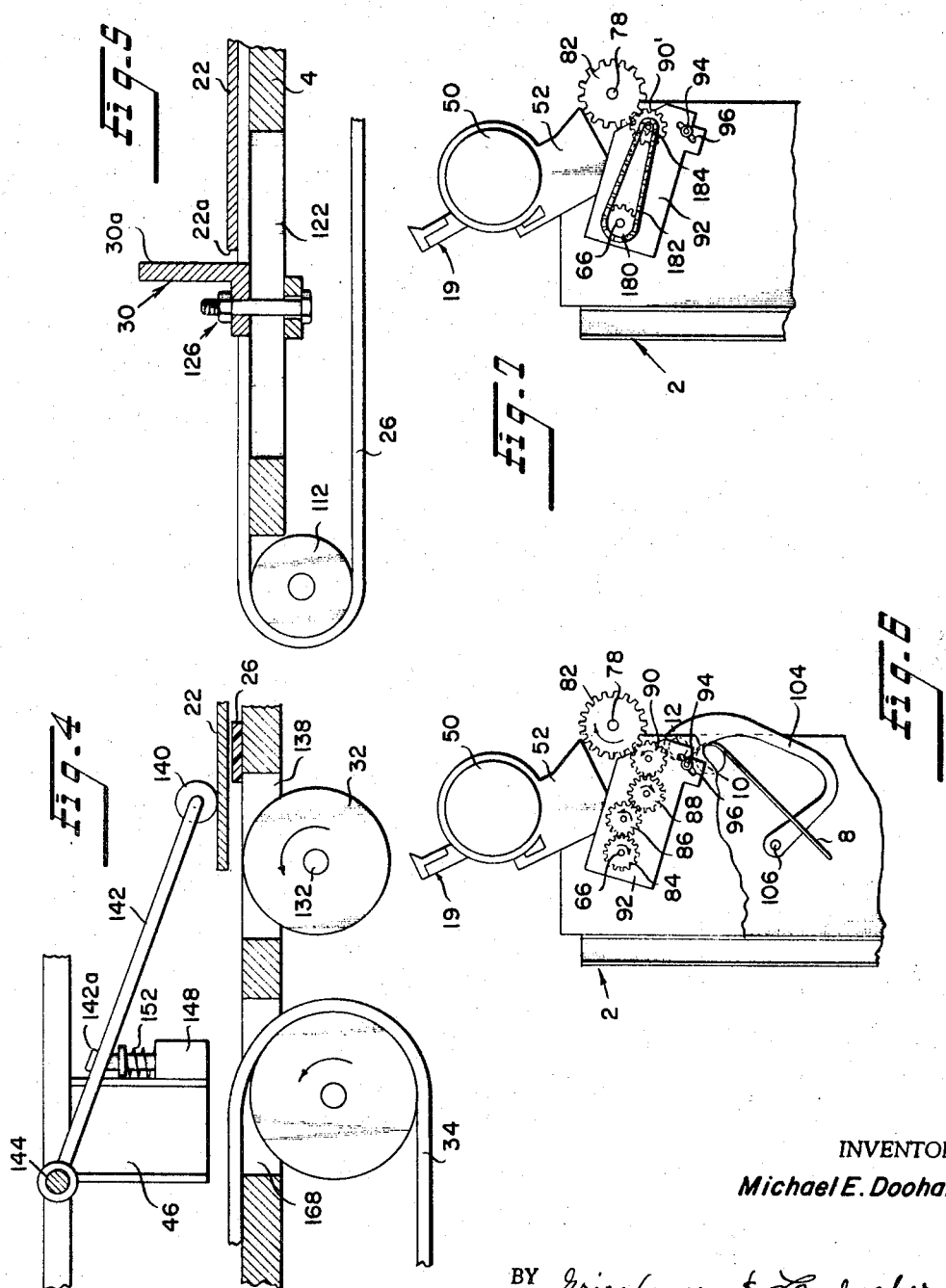

3,443,462
AUTOMATIC SHEET CUTTING AND FEEDING APPARATUS
Michael E. Doohan, West Memphis, Ark., assignor to Boise Cascade Corporation, Boise, Idaho, a corporation of Delaware
Filed Oct. 28, 1966, Ser. No. 590,269
Int. Cl. B26d 7/06; B65h 17/22, 17/20
U.S. Cl. 83—81                   12 Claims

ABSTRACT OF THE DISCLOSURE

Automatic sheet cutting and feeding apparatus, including rotary cutter means for severing a longitudinally traveling strip into successive sheets, and sheet conveying means for longitudinally conveying successive severed sheets in a common plane toward a transfer station. The invention is characterized by the provision of improved solenoid-operated transfer means actuated in synchronism with the cutter means for displacing successive sheets in said common plane in a lateral direction normal to said longitudinal direction.

---

This invention relates generally to apparatus for cutting and feeding sheets of paperboard and the like, and more particularly to apparatus including rotary cutting means for transversely severing longitudinally fed strip material into successive sheets, first conveyor means for feeding the sheets successively to a transfer station, and solenoid means at said transfer station operable periodically by said cutting means for transferring the successive sheets laterally to auxiliary conveyor means extending normal to said first conveyor means.

As evidenced by the patents of the prior art (for example, the patents to Staude No. 2,262,587, Holden No. 3,039,586, and Schikofsky No. 3,176,822), it is well known in the sheet cutting and conveying art to initially transport sheets successively in one direction toward a transfer station, and then to laterally convey the sheets, in the same plane, in another direction normal to the first. One problem inherent in the known machines is that at the instant of lateral transfer, the sheet at the transfer station is often not in exact alignment on the first conveyor means, so that when it is transferred to the second conveyor means, it not only is subject to damage, but also is often improperly aligned when fed to a subsequent processing apparatus, such as a press. In the event that sheet straightening means are provided for properly orienting the sheets on the conveyors, the instant of sheet transfer becomes extremely critical. Thus it is apparent that it is most desirable to correlate the operation of the transfer means with that of the cutter means by which the sheets are originally formed. Another problem in the known machines is the difficulty, complexity and time required for modifying the mechanisms to produce and convey sheets of different lengths, thus limiting the versatility and utility of the apparatus. For example, in the known machines of the type wherein the cutting means or the sheet transfer means are operated by feeler means arranged for engagement by the forward edge of the sheet, it is often difficult to accurately adjust the position the feeler or sensing means relative to the cutting means. When the sheets are to be continuously fed to a constant speed press or other processing apparatus at a given uniform rate, it is difficult to provide accurately cut sheets at a desired high feed rate for extended periods of time without damaging the sheets and without clogging or jamming the conveyor and/or cutter means. The present invention was developed to avoid the above and other drawbacks of the known sheet cutting and conveying machines.

The primary object of the present invention is to provide automatic sheet cutting and conveying apparatus including, in combination, rotatably driven cutting means for severing longitudinally fed strip material into sheets, conveyor means for conveying successive sheets longitudinally to a transfer station, transfer means at said transfer station for laterally displacing the successive sheets, and means operable by said cutter means for periodically operating said transfer means. According to the preferred form of the invention the transfer means is operated in synchronism with the cutter means (and also with the press or other processing means associated therewith) by cam means secured to the cutter shaft. As a consequence of the present invention, a single machine may be provided that serves both as the sheet cutting and feeding apparatus and which is readily operable for forming and processing sheets of various desired lengths within extremely close tolerances, thereby minimizing waste.

According to a more specific object of the invention, means are provided for accurately varying, within prescribed wide limits, the rate of feed of the strip material to the continuously operating cutting, conveying and transferring means, whereby sheets of various incremental lengths may be produced as desired. According to the present invention, coarse adjustment and fine adjustment means are provided for varying the peripheral speed of the feed roll means that supply the strip to the uniformly rotating cutter means. The coarse speed control means comprises a replaceable gear removably connected with the feed roll shaft, and means adjustable in accordance with the number of teeth and diameter of the replaceable gear for connecting the said replaceable gear with the cutter drive means. As a result of the coarse adjustment means, variations in the length of the severed sheet may be achieved in increments of about one-half of an inch. Fine control of the strip feed relative to the rotary cutter means is obtained by varying the effective diameter of the feed roll means. To this end, the feed roll means comprises a plurality of spaced resilient roller members that are mounted for axial compression colinearly on a shaft, whereby as the axial compressive force is increased and decreased, the effective outer diameter of the feed roll is correspondingly increased and decreased, respectively. Minute variations in length may be obtained as desired by the fine adjustment means.

In accordance with a further object of the invention, sheet straightening means are provided at the transfer station for engagement by the forward edge of a longitudinally feed sheet, whereby the sheet is straightened on the first conveyor means at (or just prior to) the actuation of the transfer means by the solenoid operating cam means at the cutting station. These sheet straightening means are adjustable longitudinally of the first conveyor means in accordance with the lengths of the sheets that are severed by the cutting means.

A further object of the invention is to provide a sheet cutting and feeding apparatus that is electro-mechanical in nature and which avoids the use of any suction or vacuum handling means. While the known machines normally require up to at least one half an hour for modification and adjustment to produce sheets of varying lengths, the improved machine of the present invention affords sheet length control in a matter of minutes without any variation in the accuracy and efficiency of the apparatus. As a result of the positive connection of the cutting, conveying and transfer means to a common drive means, successive severed paperboard sheets may be uniformly conveyed to a press or the like without sticking or damage.

Other objects and advantages of the invention will become apparent from a study of the following specification when considered in conjunction with the accompanying drawing, in which.

Figure 2:
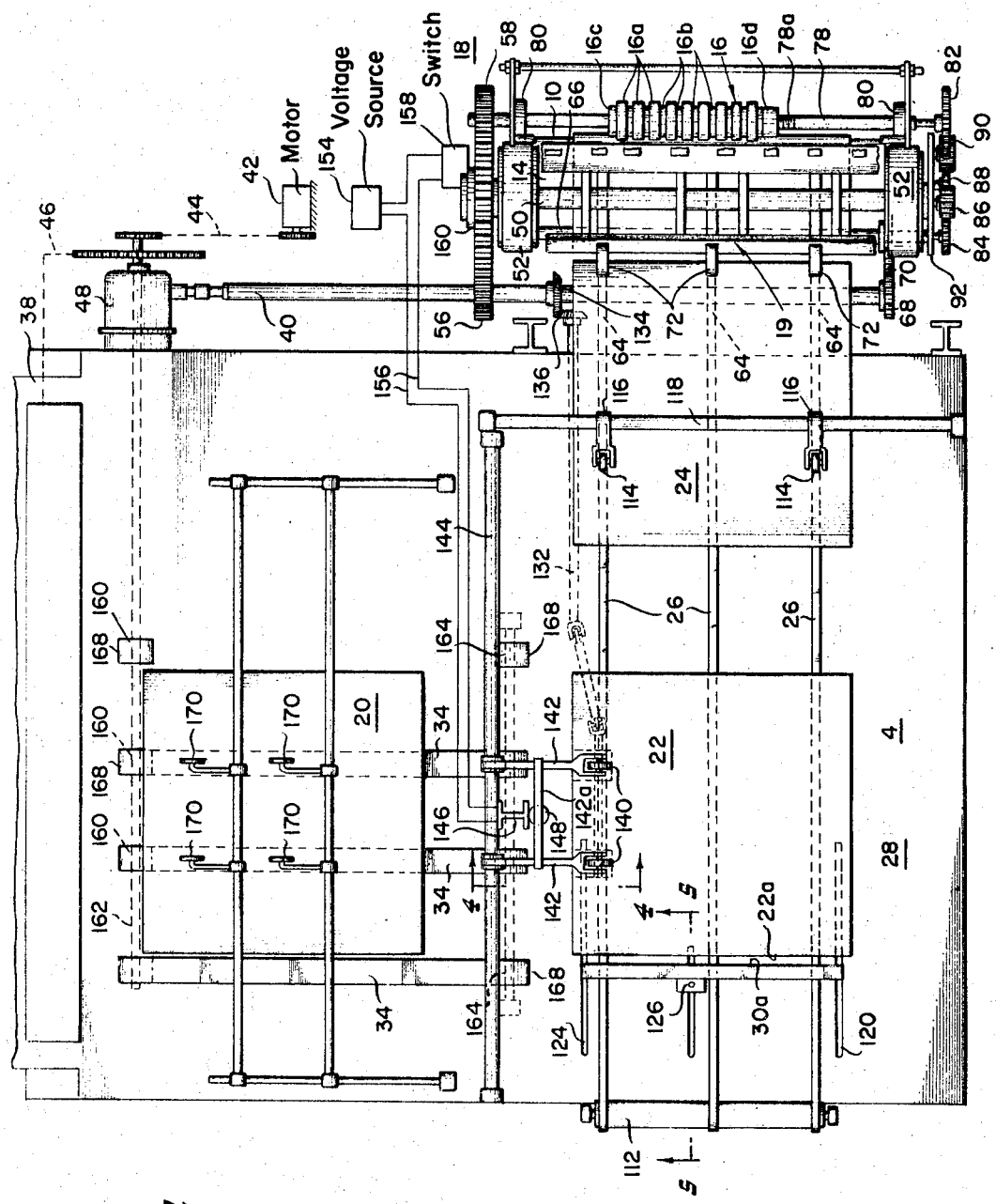

FIG. 4 and 5 are sectional views taken along lines 4—4 and 5—5, respectively, in FIG. 2;

FIG. 6 is a detailed elevational view of the feed roll drive means FIG. 2; and

FIG. 7 is a detailed view, corresponding to FIG. 6, of an alternate embodiment of the feed roll drive means.

Figure 1:
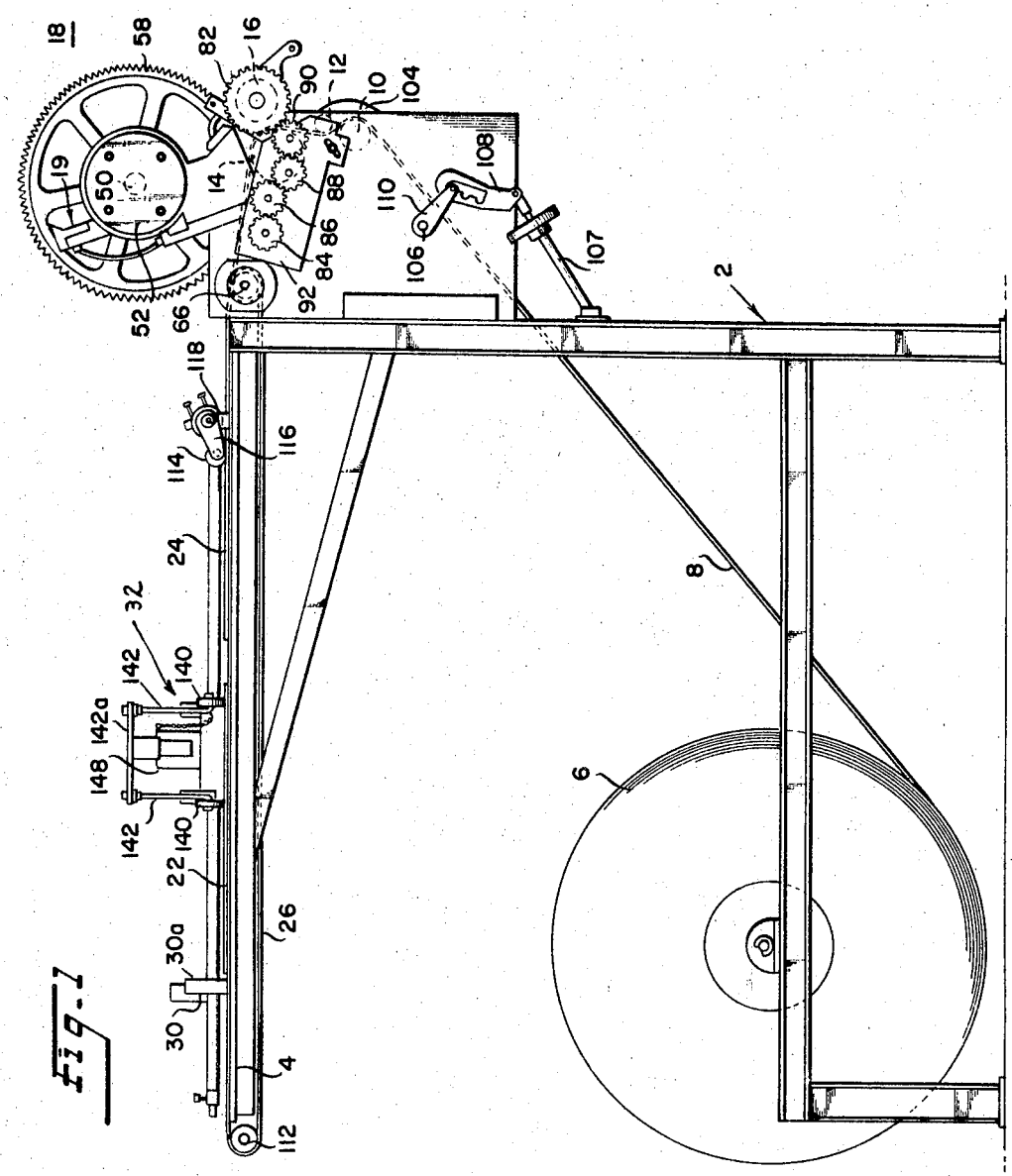
FIGS. 1 and 2 are front elevation and top plan views, respectively, of the automatic sheet cutting and feeding apparatus with certain parts removed for the sake of clarity.
Figure 3:
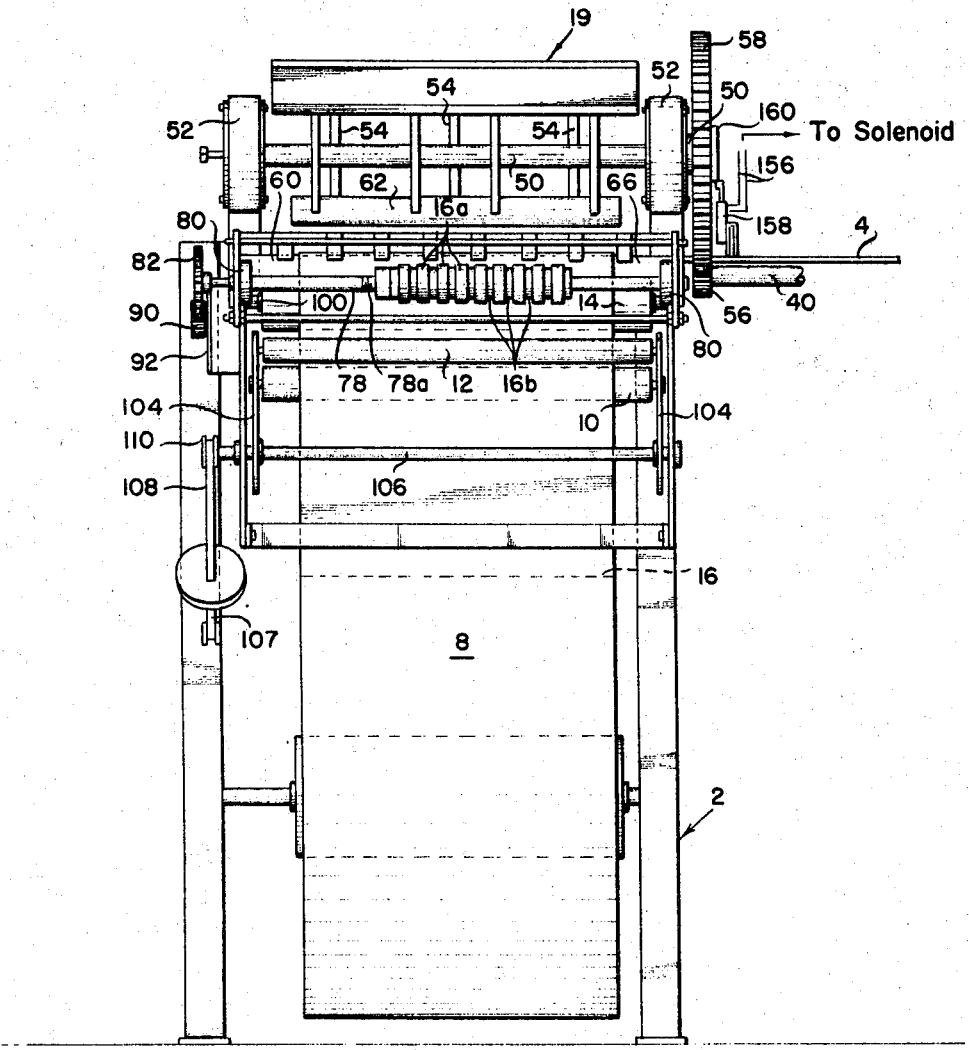
FIG. 3 is a detailed side elevational view of the apparatus of FIGS. 1 and 2.

Describing first the invention generally with reference to FIGS. 1–3, the sheet cutting and feeding apparatus includes a frame 2 supporting a generally horizontal table 4 beneath which is rotatably mounted a roll 6 of strip material (for example, paperboard, cardboard, or the like). The strip material 8 is fed from the roll 6 between a pair of relatively adjustable de-curling rollers 10, 12 and between a pair of feed rollers 14, 16 that are journaled in the frame 2. At the cutting station 18 the longitudinally traveling strip is severed by rotary knife means 19 into a plurality of successive sheets 20, 22 and 24 that are initially transported longitudinally across the table by parallel spaced endless belts 26 toward a transfer station 28 (the position of which is shown by sheet 22 in FIG. 2). When each sheet reaches the transfer station (at which the forward edge of the sheet is adjacent the adjustable guide member 30), the sheet is laterally displaced by transfer roll means 32 for deposition upon auxiliary conveyor means comprising a plurality of spaced parallel endless belts 34 arranged normal to the first conveyor belts 26. The sheet 20 transported by the auxiliary conveyor means 34 is fed in the lateral direction to a given sheet processing apparatus 38 (for example, a press or the like) that operates in synchronism with the cutter means 19.

As shown schematically in FIG. 2, the press 38 and the main drive shaft 40 of the sheet cutting and feeding apparatus are driven by motor 42 via sprocket chains 44 and 46 and gear box 48. The cutter shaft 50, which is journaled in stationary bearings 52 and carries the cutter knife 19 by radial supports 54, is driven from the drive shaft 40 by pinion 56 and driven gear 58. The cutter knife 19, which is adjustable to provide a desired cutting bias, cooperates with a stationary cutter bar 60 to sever the strip material into sheets. Counterweight 62 is secured to the shaft 50 diametrically opposite the knife 19 as shown in FIG. 3. Mounted on the drive shaft 40 are a plurality of pulleys 64 that drive the belts 26 of the first sheet conveyor means. A second shaft 66, which is driven by drive shaft 40 via gears 68 and 70, carries sheet feed rollers 72 which assist in directing the severed sheets onto the endless belts 26.

As shown in FIG. 2, the outer strip feed roller 16, which includes a shaft 78 journaled in fixed bearings 80, carries a replaceable driven gear 82 that is driven from shaft 66 via the gear train including gears 84, 86, 88 and 90. The shafts of intermediate gears 86, 88 and 90 are journaled in a support plate 92 that is mounted at one end for pivotal movement about shaft 66. As will be described below, the plate 92 is locked in desired positions of angular adjustment relative to shaft 66 by means of lock bolt 94 that extends through slot 96 into a corresponding threaded bore in the frame 2. The strip feed roll 16 includes a plurality of spaced compressible rollers 16a (formed of a resilient material, such as rubber) that are mounted on shaft 78 and between which are arranged annular spacer elements 16b. At one end the series of rollers and spacer elements are supported by a fixed shaft collar 16c, and at the other end the rollers are supported by an adjustable internally threaded sleeve 16b that is threadably mounted upon a threaded portion 78a of the shaft 78. As will be explained in greater detail below, rotation of the sleeve 16b on shaft 78 serves to compress or expand the resilient rollers 16a to vary the effective diameter of the feed roll 16. The feed roll 16 is arranged to cooperate with the idler feed roll 14 that is journaled in fixed bearings 100.

As shown in FIG. 3, the inner de-curling roll 10 is journaled in fixed bearings 102, while the other de-curling roll 12 is journaled in the ends of a pair of parallel crank arms 104 the opposite ends of which are secured to rod 106 that extends transversely across and is rotatably supported in the frame. Adjustable linkage means 107, 108, 110 (FIG. 1) connected between the frame and the shaft 106 define a de-curling control for positioning the roll 12 relative to roll 10.

As indicated above, the material is guided by spring fingers 72 onto the upper surface of conveyor belts 26 that are driven at one end by pulleys 64 and extend at their other end about idler roll 112. During the longitudinal transfer of the sheets, they are maintained upon the belts by spring or gravity-biased upper pressure rollers 114 that are carried by arms 116 secured to the rotatably supported shaft 118.

As a sheet 22 reaches the transfer station, it is straightened on the belts 26 by the engagement of the forward edge 22a thereof with the opposed vertical face 30a of side guide means 30. The sheet straightening guide means 30 includes a plurality of downwardly depending guide projections that extend within parallel spaced longitudinal grooves 120, 122 and 124, whereby the guide may be adjusted longitudinally of the sheets. By means of lock bolt means 126, the guide 30 is firmly fastened at the desired location in accordance with the length of the severed sheets (which in turn depends on the number of teeth of replaceable gear 82 and the effective diameter of strip feed roll 16, as will be described below).

The sheet transfer means includes a plurality of transversely arranged lower rollers 32 that are mounted on shaft 132 which is continuously driven at a relatively high rate of speed by main drive shaft 40 via gears 134, 136. The lower rollers 32 extend partially upwardly through corresponding openings 138 contained in table 4 adjacent the outer edge of belt 26. Mounted on the other side of sheet 22 above lower rollers 32 are upper rollers 140 that are connected to the extremities of the rigid H-shaped frame 142 the other extremities of which are mounted for pivotal movement about fixed shaft 144. Rigidly secured to the shaft 144 between the legs of the frame 142 is a support 146 which carries a normally de-energized solenoid 148 having an armature 150 that is normally biased upwardly by spring 152, as shown in FIG. 4, and is connected with the transverse portion 142a of the frame 142. The solenoid 148 is connected with the voltage source 154 (FIG. 2) by conductor means 156 containing a normally open switch 158. The switch 158 is secured to frame 2 for operation by a solenoid actuating cam 160 that is secured to the free end of cutter shaft 50. The cam has such a configuration as to periodically close switch 158 each time a sheet is severed from the strip by knife 19. Upon closing of the switch, solenoid 148 is energized to retract armature 150 against the biasing force of spring 152 and thereby pivot frame 142 downwardly to cause upper rollers 140 to firmly press the sheet 22 against the rapidly rotating resilient rollers 32. The lower rolls 32 quickly transport the sheet laterally from the transfer station onto the belts 34 of the auxiliary conveyor means, which belts are driven at one end by pulleys 160 secured to shaft 162 that is driven by gear box 48. At their other ends, the belts 34 are supported by pulleys 164 carried by idler shaft 166. The pulleys are mounted beneath corresponding openings 168 contained in table 4 whereby the upper courses of the endless belts extend across the table surface. The sheet 20 is pressed against the belts 34 by upper pressure rollers 170 for lateral transport to the press 38.

As indicated above, the press 38 and conveyor belts 34 and 26 are driven at a constant speed in synchronism with the cutter means 19. The lower transfer rollers 32 are continuously driven at a higher peripheral speed than the belts 26 to effect rapid transfer of a sheet from the first conveyor belts 26 to the second conveyor belts 34. As will be described below, the feed roll 16 is driven at a variable peripheral speed which is always less than that of the belts 26. It will be apparent that the length of the severed sheet is a function of the peripheral speed of feed roll 16 relative to the peripheral speed of the cutter means 19.

In accordance with an important feature of the present invention, means are provided for affording coarse and fine adjustment of the peripheral speed of strip feed roll 16 relative to the constant peripheral speed of the cutter means 19, whereby the length of the severed sheet may be varied as desired. Assume, for example, that the illustrated apparatus is to be varied to sever sheets of a greater length from the strip 8. In the event that the incremental increase is relatively great and a coarse adjustment is required, motor 42 is de-energized, lock bolt 94 is loosened, plate 92 is pivoted in the clockwise direction to disengage final gear 90 from replaceable gear 82, and the gear 82 is removed from shaft 78. A new gear having a smaller number of teeth and a smaller diameter than original gear 82 is then secured to shaft 78, whereupon plate 92 is pivoted in the clockwise direction to effect meshing engagement between the gear 90 and the replacement gear, bolt 94 is tightened, and motor 42 is again energized. Owing to the smaller number of teeth of the replacement gear, the feed roll 16 is rotated at a faster speed relative to cutter 19, and a longer sheet is severed from the strip material. Should a slightly larger length of severed sheet be desired, motor 42 is de-energized, sleeve 16d is rotated on shaft 78 in a direction to effect axial compression of rollers 16a and thereby increase the outer diameter and peripheral speed thereof whereby a still greater length of sheet is severed from the strip. The apparatus may now be operated for a given period of time to sever the desired number of sheets.

Assume now that a sheet of smaller length is desired. In the manner described above, there is substituted on shaft 78 a gear having a larger number of gears, whereby the peripheral speed of feed roll 16 relative to cutter 19 is reduced, so that a shorter sheet is severed from the strip. For smaller reductions in length, sleeve 16d is rotated in a direction to reduce the axial compression of the rollers 16a so that the diameter of feed roll 16 and consequently the peripheral speed thereof is reduced accordingly.

It has been found in practice that for each one tooth variation in the number of teeth of the replaceable feed roll gear 82, the length of the severed sheet is varied by approximately one-half an inch. Consequently; by providing a series of interchangeable feed roll drive gears the number of teeth of which varies by one, corresponding sheets may be severed that vary in length by one-half an inch. For a given width of strip material, sheets having lengths on the order of 25 inches to 70 inches may be readily severed by appropriate selection of the replaceable feed roll drive gear. Similarly, fine adjustment of the severed sheet up to about plus or minus three-quarters of an inch may be effected by appropriate variation of axial compression of the resilient rolls 16a by the sleeve 16b. Thus it is apparent that the apparatus of the present invention permits the extremely accurate high speed production of sheets of any predetermined size within desired critical limits.

It will be apparent to those skilled in the art that various modifications may be made in the apparatus described without deviating from the invention set forth in the following claims. For example, as shown in FIG. 7, if desired the final driving gear that meshes with the replaceable feed roll gear 82 may be driven from shaft 66 via sprocket gear 180, chain 182 and sprocket 184. Various other modifications and improvements in the apparatus described may similarly be proposed that fall within the scope of the present invention as claimed.

What is claimed is:

1. An automatic sheet cutting and feeding apparatus, comprising
    (a) rotary cutter means for severing longitudinally traveling strip material into successive sheets;
    (b) sheet conveying means for longitudinally conveying successive severed sheets in a common plane toward a transfer station;
    (c) transfer means at said transfer station for laterally displacing successive sheets in said common plane in a direction normal to said longitudinal direction, said transfer means including
        (1) continuously driven lower conveyor means above which successive sheets are longitudinally fed, the axis of said lower conveyor means being normal to the longitudinal direction of feed of said sheets, and
        (2) upper roller means arranged for movement between a released position remote from said lower conveyor means and a sheet pressing position adjacent said lower conveyor means, said upper roller means having an axis of rotation parallel with the axis of said lower conveyor means;
    (d) common drive means for driving said cutter means, said sheet conveying means, and said lower conveyor means; and
    (e) solenoid means operable by said rotary cutter means upon the formation of each sheet to displace said upper roller means from said released position to said sheet pressing position.

2. Apparatus as defined in claim 1 wherein said means for activating said transfer means comprises means including a switch for energizing said solenoid means, said switch having a normal first position and a second position for operating said solenoid means to displace said upper roller means between said released and sheet pressing positions, respectively, and cam means carried by said cutter means for periodically operating said switch between said first and second positions each time a sheet is severed from said strip.

3. Apparatus as defined in claim 1, wherein said sheet conveying means comprises a generally horizontal table, and a plurality of parallel endless belts each having portions which extend across said table for transporting successive sheets longitudinally to said transfer station, and further wherein said lower conveyor means comprise lower roller means mounted in openings contained in said table adjacent at least one of said belts.

4. Apparatus is defined in claim 3, and further including additional conveyor means for receiving the laterally displaced sheets from said transfer means and for conveying said sheets successively in the lateral direction in said common plane.

5. Apparatus as defined in claim 1, and further including strip feed means including a pair of cooperating feed rolls for feeding the strip material longitudinally to said cutter means, and means for driving said strip feed means from said common drive means at a lower speed than the speed of said sheet conveying means.

6. Apparatus as defined in claim 5, and further including means for changing the effective speed of said strip feed means relative to said cutter means to vary the length of said sheets.

7. Apparatus as defined in claim 6 wherein at least one of said feed rolls is a driven roll, and further wherein said strip speed varying means includes a replaceable driven gear removably connected with said driven feed roll, connecting means for connecting said replaceable gear with said drive means, and means for adjusting said connecting means in accordance with the number of teeth and diameter of said replaceable gear.

8. Apparatus as defined in claim 7 wherein said adjusting means includes a support plate mounted for pivotal movement about an axis parallel with and spaced from the shaft of said replaceable gear, said connecting means being carried by said support plate and including a final driving gear adapted to mesh with said replaceable gear, and means for locking said support plate in a pivoted position in which the location of said final gear corresponds with the diametric size of said replaceable gear.

9. Apparatus as defined in claim 8 wherein said connecting means includes also sprocket and chain means for transmitting motion between said drive means and said final driving gear.

10. Apparatus as defined in claim 6 wherein said strip speed varying means comprises means for varying the diameter of said driven feed roll.

11. Apparatus as defined in claim 10 wherein said driven feed roll includes a plurality of colinear axially spaced rollers formed from a resilient material, and means for axially compressing said resilient rollers to vary the diameter thereof.

12. Apparatus as defined in claim 6, and further including sheet straightening means at said transfer station comprising a side guide member connected with said table and having a face normal to said table and said belts for engagement by the forward edge of a longitudinally fed sheet at said transfer station, whereby at substantially the instant of lateral transfer of a sheet, the sheet is straightened on the table by the side guide member.

References Cited

UNITED STATES PATENTS 2,262,303   11/1941   Staude.
2,485,952   10/1949   Apgar et al.

ANDREW R. JUHASZ, *Primary Examiner.*

U.S. Cl. X.R.

83—158, 436; 226—175, 191; 271—53